United States Patent
Krick et al.

(10) Patent No.: US 12,149,172 B2
(45) Date of Patent: Nov. 19, 2024

(54) LIGHTING SYSTEM COMPRISING A MULTI-PHASE INTERLEAVED POWER CONVERTER

(71) Applicant: VALEO VISION, Bobigny (FR)

(72) Inventors: Sebastian Krick, Bobigny (FR); Guillaume Zante, Bobigny (FR); Thomas Giraud-Sauveur, Bobigny (FR); Dominique Bodziany, Bobigny (FR)

(73) Assignee: VALEO VISION, Bobigny (FR)

( * ) Notice: Subject to any disclaimer, the term of this patent is extended or adjusted under 35 U.S.C. 154(b) by 147 days.

(21) Appl. No.: 17/769,242

(22) PCT Filed: Oct. 14, 2020

(86) PCT No.: PCT/EP2020/078973
§ 371 (c)(1),
(2) Date: Apr. 14, 2022

(87) PCT Pub. No.: WO2021/074258
PCT Pub. Date: Apr. 22, 2021

(65) Prior Publication Data
US 2022/0399814 A1  Dec. 15, 2022

(30) Foreign Application Priority Data
Oct. 15, 2019 (FR) ...................................... 1911448

(51) Int. Cl.
*H02M 3/158* (2006.01)
*H05B 45/3725* (2020.01)

(52) U.S. Cl.
CPC ...... *H02M 3/1584* (2013.01); *H05B 45/3725* (2020.01)

(58) Field of Classification Search
CPC .. H02M 3/1584; H02M 3/1586; H02M 1/088; H02M 3/158; H05B 45/3725; H05B 45/345; H05B 45/37; H05B 45/325
(Continued)

(56) References Cited

U.S. PATENT DOCUMENTS

| | | | |
|---|---|---|---|
| 10,090,765 B1 * | 10/2018 | Kanzian | H02M 3/1588 |
| 2006/0012351 A1 * | 1/2006 | Moussaoui | H02M 3/1584 323/271 |

(Continued)

FOREIGN PATENT DOCUMENTS

EP   2615731 A1 *   7/2013   .......... H02M 3/1584

*Primary Examiner* — Ryan Jager
(74) *Attorney, Agent, or Firm* — Oblon, McClelland, Maier & Neustadt, L.L.P.

(57) ABSTRACT

A motor vehicle lighting system includes a light source, a multi-phase interleaved power converter having a plurality of selectively activatable elementary converters, each of which is configured to generate an electrical signal having its own phase. The power converter is designed to supply electrical power to the light source, and controller is designed to selectively control each of the elementary converters of the power converter. The controller is designed to receive an emission command for the emission of a desired light beam by the light source and to activate a strictly necessary number of elementary converters of the power converter such that the power converter supplies, to the light source, an electrical power needed to emit the desired light beam.

20 Claims, 2 Drawing Sheets

(58) Field of Classification Search
USPC .......................................................... 315/291
See application file for complete search history.

(56) References Cited

U.S. PATENT DOCUMENTS

| | | | |
|---|---|---|---|
| 2006/0038543 A1* | 2/2006 | Hazucha ............. | H02M 3/1584 |
| | | | 323/282 |
| 2015/0137787 A1* | 5/2015 | Daub ................. | H05B 45/3725 |
| | | | 323/304 |
| 2016/0001699 A1* | 1/2016 | Krick ................. | H05B 45/3725 |
| | | | 315/77 |
| 2016/0125791 A1* | 5/2016 | Park .................... | H02M 3/1584 |
| | | | 345/76 |
| 2018/0138815 A1* | 5/2018 | Yamada .................. | H02M 3/07 |
| 2022/0294352 A1* | 9/2022 | Wu ..................... | H02M 1/0032 |
| 2022/0399814 A1* | 12/2022 | Krick .................. | H05B 45/345 |

* cited by examiner

LIGHTING SYSTEM COMPRISING A MULTI-PHASE INTERLEAVED POWER CONVERTER

The invention relates to the field of motor-vehicle lighting. More precisely, the invention relates to a lighting system incorporating a multi-phase interleaved power converter and to a method for controlling such a lighting system.

In the field of motor-vehicle lighting, lighting systems are known that comprise enough selectively controllable elementary light sources to make it possible to perform pixelated light functions, such systems for example containing at least 500 pixels, or even more than 10000 pixels, each pixel being formed by an elementary light beam emitted by one of the elementary light sources. This type of lighting system makes it possible for the motor vehicle to perform, for example, anti-dazzle high-beam lighting functions, in which some pixels of the high beam are switched off or dimmed to form a dark region around a target object not to be dazzled, such as a vehicle being followed or passed.

In this context, this type of lighting system requires a high electrical power, insofar as the sought-after lighting functions may require a high light intensity, and a high electrical current. Specifically, since each pixel is produced by one elementary light source, each elementary light source requires its own electrical current. Due to the number of elementary light sources employed in this type of lighting system, the overall electrical current required may thus be very high.

Thus, it is known to employ a multi-phase interleaved power converter comprising a plurality of selectively activatable elementary converters. Each of the elementary converters generates an electrical signal having its own specific phase and the generated electrical signals are thus all mutually out of phase. It is thus possible to generate a very high overall electrical current. Furthermore, this type of power converter has the advantage of allowing MOS-transistor integration into the controller of the converter, of employing standard components facilitating the design and manufacture of the converter and of spreading out the heating of the converter over a larger area.

However, the efficiency of the elementary converters, and therefore of the power converter, decreases at low output currents. But, the mission profile of the lighting systems in question requires, in a certain number of cases, a high number of elementary light sources to be deactivated, for example for low-beam or anti-dazzle high-beam lighting functions or indeed lighting functions that cause writing to appear on the ground. In this context, the requirement for current of the lighting system is decreased and the efficiency of the power converter is no longer ideal. In other words, the ratio between the input electrical power and the output electrical power of the power converter is no longer optimal, this being a problem in the context of optimization of the power consumption of the motor vehicle.

The invention falls within this context and thus aims to optimize the efficiency of a multi-phase interleaved power converter of a motor-vehicle lighting system, including at low electrical currents.

To this end, one subject of the invention is a lighting system for a motor vehicle, comprising:
 a. a light source,
 b. a multi-phase interleaved power converter comprising a plurality of selectively activatable elementary converters, each elementary converter being arranged to generate an electrical signal having a specific phase, the power converter being arranged to deliver electrical power to said light source; and
 c. a controller arranged to selectively control each of the elementary converters of said power converter.

The invention is characterized in that the controller is arranged to receive an instruction to emit a desired light beam with the light source and to activate a strictly necessary number of elementary converters of the power converter so that the power converter delivers, to the light source, an electrical power required to emit said desired light beam.

The invention takes advantage of the fact that the elementary converters of a multi-phase interleaved power converter can be activated or deactivated selectively. Specifically, the inflection point, in terms of output current, of the efficiency of a multi-phase interleaved power converter depends on the number of elementary converters activated. The fewer elementary converters activated, the lower the output-current limit at which an inflection is observed in the efficiency of the power converter. Of course, the overall electrical power delivered by the power converter is decreased, but this decrease is not incompatible with the need in terms of electrical power of the lighting functions in question. Thus, by virtue of the activation of the strictly necessary number of elementary converters, a compromise is reached between the delivered electrical power and the efficiency of the power converter.

According to the invention, the elementary converters will possibly be DC/DC converters, for example step-down converters (also called buck converters). For example, each elementary converter will possibly be arranged to generate a periodic electrical signal, for example a PWM electrical signal (PWM being the acronym of pulse width modulation). Where appropriate, the elementary converters are arranged so that the electrical signals that they generate are mutually out of phase. Advantageously, each of the elementary converters has an activation input for receiving a control signal that controls activation or deactivation of the converter, the controller being arranged to send a control signal to the activation input of each of the elementary converters to activate said strictly necessary number of elementary converters.

In one embodiment of the invention, the controller is arranged, upon receipt of the instruction to emit said desired light beam, to determine said amount of electrical power required to be delivered to the light source to emit said desired light beam, and to determine a strictly necessary number of elementary converters to be activated to deliver said required amount of electrical power.

Advantageously, the controller may be arranged to receive the instruction to emit the desired light beam in the form of a digital image of said desired light beam, and to determine said required amount of electrical power on the basis of said digital image. The emit instruction may for example be generated by a computer of the motor vehicle, depending on information originating from one or more sensors of the motor vehicle, such as a camera, a radar or a navigation system. Where appropriate, each pixel of the received digital image may represent the light intensity of the desired light beam at one point in space. It will possibly for example be a question of a digital image representing a projection on a screen of a low beam, or of an anti-dazzle high beam in which a dark region is formed, in the beam, around an object not to be dazzled, or even of a lighting beam that causes writing to appear on the ground, in which beam a pictogram is formed in a low beam.

For example, the controller may be arranged to receive the digital image in the form of a grayscale image and to determine said required amount of electrical power depending on the sum of the grayscale levels of said received digital image. Where appropriate, the grayscale level of each pixel may represent the light intensity of the desired light beam at one point in space. Preferably, the controller may determine said required amount of electrical power depending on the sum of the grayscale levels, on the output voltage delivered by the power converter and on the peak amplitude of the electrical currents flowing through the light source and generated by the electrical voltage of the elementary converters.

Advantageously, all the elementary converters are arranged so that the electrical signals that they generate deliver the same electrical power. For example, all the elementary converters may be arranged so that the electrical signals that they generate are periodic electrical signals having the same peak amplitude and the same duty cycle.

Advantageously, a single elementary converter of the power converter, which is called the master converter, is voltage-controlled. Where appropriate, the master converter is arranged to send information relating to the amplitude of the electrical signal that it generates to the other elementary converters, which are called slave converters, the slave converters each being arranged to generate an electrical signal of amplitude compliant with the information received from the master converter. For example, only the master converter comprises a feedback loop, the slave converters having no feedback loop between their outputs and their inputs. Where appropriate, the controller may be arranged to keep the master converter activated regardless of the determined required electrical power.

Advantageously, the light source comprises a plurality of elementary light sources, each of the elementary light sources being arranged to emit one luminous pixel, wherein the emit instruction received by the controller is an instruction to emit a desired pixelated light beam and wherein the controller is arranged to selectively control each of the elementary light sources so that said desired pixelated light beam is emitted. Where appropriate, the controller may be arranged to send a control instruction to the light source, the control instruction comprising the digital image received by the controller. For example, the desired pixelated light beam may be a light beam comprising a plurality of pixels, for example 500 pixels of dimensions comprised between 0.05° and 0.2°, distributed over a plurality of rows and columns, for example 20 rows and 25 columns.

By elementary light source what is meant is any light source (optionally associated with an electro-optical element) capable of being selectively activated and controlled so as to emit an elementary light beam the light intensity of which is controllable. It could in particular be a question of a light-emitting semiconductor chip, of a light-emitting element of a monolithic pixelated light-emitting diode, of a segment of a light-converting element excitable by a light source, or even of a light source associated with a liquid crystal or with a micromirror.

Another subject of the invention is a method for controlling a motor-vehicle lighting system comprising a light source, a multi-phase interleaved power converter comprising a plurality of selectively activatable elementary converters, each elementary converter being arranged to generate an electrical signal having a specific phase, the power converter being arranged to deliver an electrical power to said light source, and a controller arranged to selectively control each of the elementary converters of said power converter, the method comprising the following steps:

a. receipt by the controller of an instruction to emit a desired light beam with the light source;
b. determination by the controller of an amount of electrical power required to be delivered by the power converter to the light source for said desired light beam to be emitted;
c. determination by the controller of a strictly necessary number of elementary converters to be activated to deliver said required amount of electrical power;
d. activation by the controller of said determined number of elementary converters to deliver to the light source said amount of electrical power required for said desired light beam to be emitted.

Where appropriate, the control method may be implemented by the lighting system according to the invention.

Advantageously, the controller may receive emit instructions sequentially. Where appropriate, on receipt of a new emit instruction, the controller may activate one or more of the elementary controllers deactivated or deactivate one or more of the elementary controllers activated following the control instruction received previously so that the number of activated elementary converters determined following receipt of this new emit instruction is reached. The elementary controllers may for example be activated or deactivated incrementally starting from the master controller.

Advantageously, the instruction to emit the desired light beam is received by the controller in the form of a digital image of said desired light beam, and the required amount of electrical power is determined by the controller on the basis of said digital image. Preferably, the digital image received by the controller is a grayscale image, and the required amount of electrical power determined by the controller is a function of the sum of the grayscale levels of said received digital image.

Another subject of the invention is a computer program comprising a program code that is designed to implement the method according to the invention when said program is executed by a computer.

Another subject of the invention is a data medium on which the computer program according to the invention is stored.

The present invention will now be described by way of examples that are only illustrative and that in no way limit the scope of the invention, and with reference to the accompanying illustrations, in which.

In the following description, elements that are identical in terms of structure or in terms of function and that appear in various figures have been designated with the same reference, unless otherwise indicated.

Figure 1:
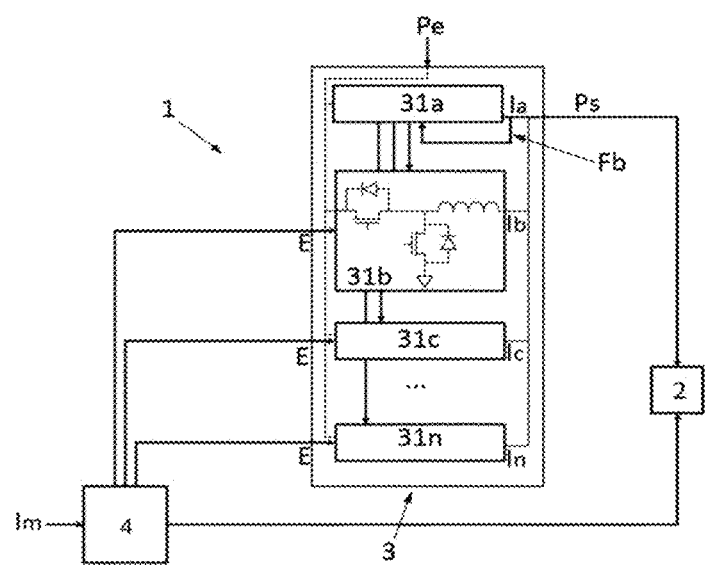
FIG. 1 shows, schematically and partially, a motor-vehicle lighting system according to one embodiment of the invention.

FIG. 1 shows a lighting system 1 of a motor vehicle according to one embodiment of the invention.

This lighting system 1 comprises a pixelated light source 2 able to emit a pixelated light beam. In the example described, the pixelated light source 2 is a pixelated light-emitting diode, for example a monolithic pixelated light-emitting diode, each of the light-emitting elements of which forms one elementary light source that is able to be selectively activated and controlled to emit an elementary light beam the light intensity of which is controllable and that thus forms one pixel of the pixelated light beam. The pixelated light source 2 may form part of a luminous module of the lighting system and thus be associated therein with an optical element allowing the elementary light beams to be formed. The lighting system 2 may further comprise other luminous modules or light sources, whether pixelated or not.

In order to allow a pixelated light beam to be emitted, the lighting system 1 comprises a power converter 3 arranged to deliver, from an electrical power Pe received from an energy source of the motor vehicle, such as a battery, an electrical power Ps to the pixelated light source 2. Furthermore, in order to control the intensity and the distribution of the pixelated light beam, the lighting system 1 further comprises a controller 4 arranged to control, on the one hand, the pixelated light source 2, and more specifically each of the elementary light sources of this source 2, and, on the other hand, the power converter 3.

The power converter 3 is a multi-phase interleaved converter comprising a plurality of elementary converters 31a to 31n. In the described example, each converter 31a to 31n is a DC/DC buck converter arranged to generate, from the electrical power Pe, a PWM electrical signal having a given peak amplitude, a given phase and a given duty cycle. The converters 31a to 31n have a substantially identical structure, such as shown for the converter 31b, and hence the electrical signals that they generate have the same peak amplitude and the same duty cycle. In contrast, their phases are different, and hence these signals are mutually out of phase. Thus, all of the electrical signals together form the electrical power Ps delivered to the pixelated light source 2, this electrical power Ps being characterized by an electrical current high enough to supply the source 2 satisfactorily given the number of elementary light sources that it comprises.

Although the structures of the converters 31a to 31n are substantially identical, only the first elementary converter 31a, which is called the master converter, is voltage-controlled. For this purpose this converter 31a comprises a feedback loop Fb, to make the current $I_a$ output by this converter 31a compliant with a given setpoint value. Furthermore, the other converters 31b to 31n are slave converters, devoid of feedback loop from the output of the power converter 3. The master converter 31a transmits, via control lines, the peak amplitude of the electrical signal $I_a$ that it generates to the other slave converters 31b to 31n. These slave converters are each arranged to generate an electrical signal $I_b$ to $I_n$ of peak amplitude substantially equal to this peak amplitude $I_a$.

Each of the slave converters 31b to 31n has an activation input E for receiving from the controller 4 a control signal that controls activation or deactivation of this converter, for example by switching the supply line of this converter.

Figure 2:
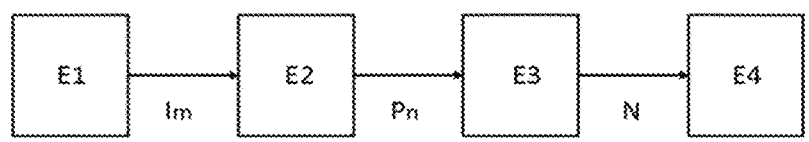
FIG. 2 shows a method for controlling the lighting system of [FIG. 1]

With reference to [FIG. 2], a method for controlling the lighting system 1 by means of the controller 4 will now be described.

In a first step E1, the controller 4 receives an instruction Im to emit a desired pixelated light beam with the pixelated light source 2. This emit instruction Im is generated by a computer of the motor vehicle (not shown), depending on information originating from one or more sensors of the motor vehicle, such as a camera, a radar or a navigation system. In the described example, the emit instruction is received in the form of a digital image Im representing, in grayscale, a projection of said desired pixelated light beam. In other words, each pixel of the received digital image Im represents, via a grayscale value, the light intensity of the desired light beam at one point in space.

In a second step E2, the controller 4 determines an amount of electrical power Pn required to be delivered by the power converter 3 to the light source 2 for said desired light beam to be emitted. For example, the controller may determine this required electrical power Pn using the following equation:

$$Pn = V_s I_{peak} \Sigma_i G_i \qquad \text{[Math. 1]}$$

where $V_s$ is the electric voltage output by the power converter 3, $I_{peak}$ is the peak amplitude of the electrical currents flowing through the pixelated light source 2 and generated by the electric voltage delivered by the elementary converters 31a to 31n and $\Sigma_i G_i$ is the sum of the grayscale values of each pixel of the image Im.

In a third step E3, the controller 4 determines a strictly necessary number N of elementary converters 31b to 31n to activate to deliver said required amount of electrical power Pn, the master converter 31a remaining activated in all cases.

The strictly necessary number N of converters 31b to 31n to activate may be determined by the controller 4 so as, on the one hand, to ensure the amplitude of the electrical current output by the power converter 3 is sufficient with regard to the number of elementary light sources of the pixelated light source that must be activated to produce the pixelated light beam of the emit instruction Im and, on the other hand, to obtain an optimum efficiency from the power converter 3.

Figure 3:
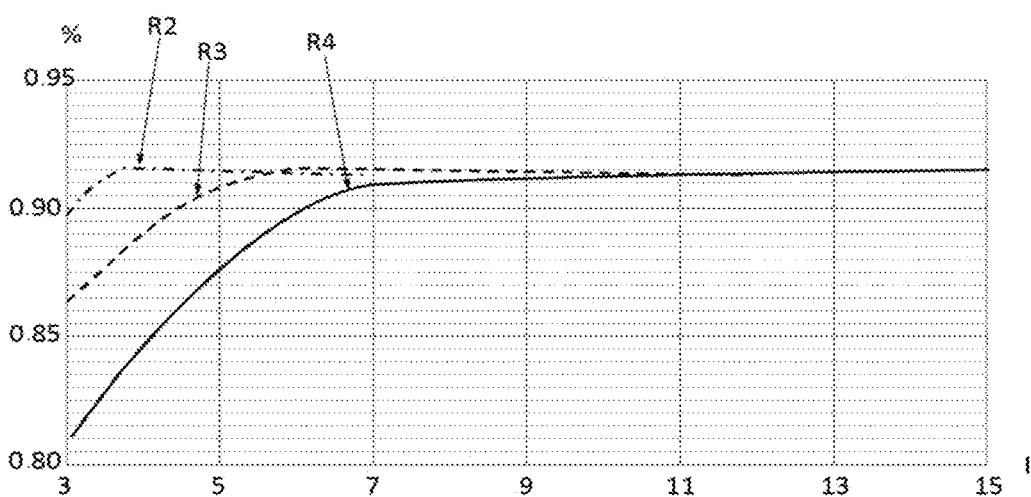
FIG. 3 shows efficiency curves of the power converter of the lighting system of [FIG. 1]

FIG. 3 shows curves R2, R3 and R4 showing the variation in the efficiency of the power converter 3 (namely the power Ps delivered by the converter 3 divided by the input power Pe of the converter 3) as a function of the amplitude of the current delivered by this power converter 3, when 2, 3 and 4 elementary converters are activated, respectively.

Figure 4:
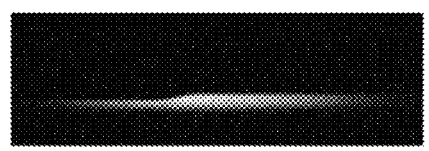
FIG. 4 shows an instruction to emit a low beam for the lighting system of [FIG. 1]
Figure 5:
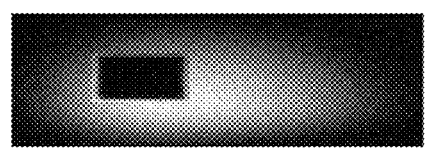
FIG. 5 shows an instruction to emit an anti-dazzle high beam for the lighting system of [FIG. 1].

It may be seen that the inflection point at which the efficiency becomes substantially optimal (approximately 93%) and constant is lower when fewer elementary converters are activated. Thus, when the required pixelated light beam contains few turned-on pixels, as is the case for a low beam such as shown in [FIG. 4], few elementary light sources of the light source 2 need to be activated. There is therefore less need for the power converter 3 to deliver current, and therefore electrical power, and the efficiency of this converter 3 may therefore be maximized by activating only two elementary converters 31a and 31b. In contrast, when the required pixelated light beam contains many turned-on pixels, as is the case for an anti-dazzle high beam such as shown in [FIG. 5], the need for current increases. The efficiency of the converter 3 is thus maximized while meeting this need by activating additional elementary converters 31c and 31d.

Thus, in a step E4, the controller 3 receiving sequential emit instructions, it thus activates or deactivates the elementary controllers 31b to 31c of the power converter 3, via their activation inputs E, incrementally to reach the previously determined number N of converters, so as to adapt the electrical power delivered in response to the previous instruction to the new power Pn required for the new instruction Im. At the same time, the controller 3 will transmit the digital image Im to the light source 2, so as to control activation or deactivation of each of the elementary light sources with a view to emitting a pixelated light beam corresponding to this digital image Im.

The above description clearly explained how the invention allows the objectives that were set therefor to be achieved, in particular by providing a lighting system that employs a multi-phase interlaced power converter and a method for controlling this lighting system that activates a strictly necessary number of elementary converters of the power converter depending on the emit instruction received by the system. It will thus be understood that the use of a multi-phase interlaced power converter allows the substantial needs for electrical current of a light source to be met, in particular when it is pixelated, and that activation of the strictly necessary number of elementary converters allows the efficiency of the power converter to be optimized depending on the electrical power required to carry out the received emit instruction.

In any event, the invention should not be regarded as being limited to the embodiments specifically described in this document, and extends, in particular, to any equivalent means and to any technically operative combination of these means. In particular, provision will possibly be made for the electrical power required to carry out a given emit instruction to be computed in a way other than that described or for the strictly necessary number of elementary converters to be selected in a way other than that described, or indeed, for the multi-phase interleaved power converter to have a structure other than that described.

The invention claimed is:

1. A lighting system for a motor vehicle, comprising:
   a light source;
   a multi-phase interleaved power converter comprising a plurality of selectively activatable elementary converters, each elementary converter being arranged to generate an electrical signal having a specific phase, the power converter being arranged to deliver electrical power to said light source; and
   a controller arranged to selectively control each of the elementary converters of said power converter;
   wherein the controller is arranged to receive an instruction to emit a desired light beam with the light source and to activate a strictly necessary number of elementary converters of the power converter so that the power converter delivers, to the light source, an amount of electrical power required to emit said desired light beam, and
   the strictly necessary number of elementary converters is a number of elementary converters that delivers the amount of electrical power required to emit said desired light beam with a maximum efficiency compared to another number of elementary converters.

2. The lighting system as claimed in claim 1, wherein the controller is arranged, upon receipt of the instruction to emit said desired light beam, to determine said required amount of electrical power required to be delivered to the light source to emit said desired light beam, and to determine the strictly necessary number of elementary converters to be activated to deliver said required amount of electrical power.

3. The lighting system as claimed in claim 2, wherein the controller is arranged to receive the instruction to emit the desired light beam in the form of a digital image of said desired light beam, and to determine said required amount of electrical power on the basis of said digital image.

4. The lighting system as claimed in claim 3, wherein the light source comprises a plurality of elementary light sources, each of the elementary light sources being arranged to emit one luminous pixel, wherein the emit instruction received by the controller is an instruction to emit a desired pixelated light beam and wherein the controller is arranged to selectively control each of the elementary light sources so that said desired pixelated light beam is emitted.

5. The lighting system as claimed in claim 3, wherein all the elementary converters are arranged so that the electrical signals that they generate have the same electrical power.

6. The lighting system as claimed in claim 5, wherein a single elementary converter of the power converter is a master converter and is voltage-controlled, and is arranged to send information relating to an amplitude of the electrical signal that the master converter generates to the other elementary converters, which are slave converters, the slave converters each being arranged to generate an electrical signal of amplitude compliant with the information received from the master converter.

7. The lighting system as claimed in claim 2, wherein all the elementary converters are arranged so that the electrical signals that they generate have the same electrical power.

8. The lighting system as claimed in claim 7, wherein a single elementary converter of the power converter is a master converter and is voltage-controlled, and is arranged to send information relating to an amplitude of the electrical signal that the master converter generates to the other elementary converters, which are slave converters, the slave converters each being arranged to generate an electrical signal of amplitude compliant with the information received from the master converter.

9. The lighting system as claimed in claim 7, wherein a single elementary converter of the power converter is a master converter and is voltage-controlled, and is arranged to send information relating to an amplitude of the electrical signal that the master converter generates to the other elementary converters, which are slave converters, the slave converters each being arranged to generate an electrical signal of amplitude compliant with the information received from the master converter.

10. The lighting system as claimed in claim 2, wherein the light source comprises a plurality of elementary light sources, each of the elementary light sources being arranged to emit one luminous pixel, wherein the emit instruction received by the controller is an instruction to emit a desired pixelated light beam and wherein the controller is arranged to selectively control each of the elementary light sources so that said desired pixelated light beam is emitted.

11. The lighting system as claimed in claim 1, wherein all the elementary converters are arranged so that the electrical signals that they generate have the same electrical power.

12. The lighting system as claimed in claim 11, wherein a single elementary converter of the power converter is a master converter and is voltage-controlled, and is arranged to send information relating to an amplitude of the electrical signal that the master converter generates to the other elementary converters, which are slave converters, the slave converters each being arranged to generate an electrical signal of amplitude compliant with the information received from the master converter.

13. The lighting system as claimed in claim 12, wherein the light source comprises a plurality of elementary light sources, each of the elementary light sources being arranged to emit one luminous pixel, wherein the emit instruction received by the controller is an instruction to emit a desired pixelated light beam and wherein the controller is arranged to selectively control each of the elementary light sources so that said desired pixelated light beam is emitted.

14. The lighting system as claimed in claim 11, wherein the light source comprises a plurality of elementary light sources, each of the elementary light sources being arranged to emit one luminous pixel, wherein the emit instruction received by the controller is an instruction to emit a desired pixelated light beam and wherein the controller is arranged to selectively control each of the elementary light sources so that said desired pixelated light beam is emitted.

15. The lighting system as claimed in claim 1, wherein the light source comprises a plurality of elementary light sources, each of the elementary light sources being arranged to emit one luminous pixel, wherein the emit instruction received by the controller is an instruction to emit a desired pixelated light beam and wherein the controller is arranged to selectively control each of the elementary light sources so that said desired pixelated light beam is emitted.

16. A method for controlling a motor-vehicle lighting system comprising a light source, a multi-phase interleaved power converter comprising a plurality of selectively activatable elementary converters, each elementary converter being arranged to generate an electrical signal having a specific phase, the power converter being arranged to deliver an electrical power to said light source, and a controller arranged to selectively control each of the elementary converters of said power converter, the method comprising the following steps:
    receiving, by the controller, an instruction to emit a desired light beam with the light source;
    determining, by the controller, an amount of electrical power required to be delivered by the power converter to the light source for said desired light beam to be emitted;
    determining, by the controller, a strictly necessary number of elementary converters to be activated to deliver said required amount of electrical power; and
    activating, by the controller, said determined number of elementary converters to deliver to the light source said required amount of electrical power required for said desired light beam to be emitted,
    wherein the strictly necessary number of elementary converters is a number of elementary converters that delivers the amount of electrical power required to emit said desired light beam with maximum efficiency compared to another number of elementary converters.

17. The control method as claimed in claim 16, wherein the instruction to emit the desired light beam is received by the controller in the form of a digital image of said desired light beam, and wherein the required amount of electrical power is determined by the controller on the basis of said digital image.

18. A computer program comprising a program code that is configured to implement a method for controlling a motor-vehicle lighting system comprising a light source, a multi-phase interleaved power converter comprising a plurality of selectively activatable elementary converters, each elementary converter being arranged to generate an electrical signal having a specific phase, the power converter being arranged to deliver an electrical power to said light source, and a controller arranged to selectively control each of the elementary converters of said power converter when said computer program is executed by a computer, the method comprising:
    receiving an instruction to emit a desired light beam with the light source;
    determining an amount of electrical power required to be delivered by the power converter to the light source for said desired light beam to be emitted;
    determining a strictly necessary number of elementary converters to be activated to deliver said required amount of electrical power; and
    activating said determined number of elementary converters to deliver to the light source said required amount of electrical power required for said desired light beam to be emitted,
    wherein the strictly necessary number of elementary converters is a number of elementary converters that delivers the amount of electrical power required to emit said desired light beam with a maximum efficiency compared to another number of elementary converters.

19. A data medium on which the computer program as claimed in claim 18 is stored.

20. The computer program comprising a program code that is designed to implement the method as claimed in claim 18, wherein the instruction to emit the desired light beam is received in the form of a digital image of said desired light beam, and wherein the required amount of electrical power is determined on the basis of said digital image.

* * * * *